US008664168B2

(12) United States Patent
Steiner

(10) Patent No.: US 8,664,168 B2
(45) Date of Patent: Mar. 4, 2014

(54) METHOD OF USING COMPOSITES IN THE TREATMENT OF WELLS

(75) Inventor: William H. Steiner, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 495 days.

(21) Appl. No.: 13/076,304

(22) Filed: Mar. 30, 2011

(65) Prior Publication Data
US 2012/0252706 A1 Oct. 4, 2012

(51) Int. Cl.
C09K 8/52 (2006.01)
C09K 8/524 (2006.01)
C09K 8/528 (2006.01)
C09K 8/74 (2006.01)
E21B 43/25 (2006.01)

(52) U.S. Cl.
USPC ........... 507/269; 507/204; 507/219; 166/278; 166/305.1; 166/308.1

(58) Field of Classification Search
None
See application file for complete search history.

(56) References Cited

U.S. PATENT DOCUMENTS

| 1,570,537 | A | | 1/1926 | Teitsworth |
| 3,179,170 | A | | 4/1965 | Burtch et al. |
| 3,213,018 | A | | 10/1965 | Roland et al. |
| 3,850,248 | A | | 11/1974 | Carney |
| 4,108,779 | A | | 8/1978 | Carney |
| 4,526,240 | A | * | 7/1985 | McKinley et al. ............ 175/72 |
| 4,552,591 | A | | 11/1985 | Millar |
| 4,738,897 | A | | 4/1988 | McDougall et al. |
| 4,779,679 | A | | 10/1988 | Snavely, Jr. et al. |
| 4,986,353 | A | | 1/1991 | Clark et al. |
| 5,102,558 | A | | 4/1992 | McDougall et al. |
| 5,224,543 | A | | 7/1993 | Watkins et al. |
| 5,370,852 | A | * | 12/1994 | Ikawa et al. .................. 423/335 |
| 5,741,758 | A | | 4/1998 | Pakulski |
| 5,758,725 | A | | 6/1998 | Streetman |
| 5,777,090 | A | | 7/1998 | Verraest et al. |
| 5,893,416 | A | | 4/1999 | Read |

(Continued)

FOREIGN PATENT DOCUMENTS

CA 1262507 A1 10/1989
GB 2298440 A 9/1996

(Continued)

OTHER PUBLICATIONS

P.J.C. Webb AEA Technology PLC, T.A., et al.; "Revolutionary New Chemical Delivery System for Fractured, Gravel Packed and Prepacked Screen Wells"; SPE 38164; SPE European Formation Damage Conference in the Hague, The Netherlands, Jun. 2-3, 1997; pp. 211-218.

(Continued)

Primary Examiner — John J Figueroa
(74) Attorney, Agent, or Firm — John Wilson Jones; Jones & Smith, LLP

(57) ABSTRACT

A well treatment composite comprising a well treatment agent adsorbed onto a water-insoluble adsorbent may be prepared by precipitating the well treatment agent, in the presence of a metal salt, from a liquid while the well treatment agent is being adsorbed onto the water-insoluble adsorbent. After a treatment fluid containing the composite is introduced into a well or a subterranean formation, the well treatment agent is slowly released from the composite. The composite permits a continuous supply of the well treatment agent into a targeted area and is particularly effective in high pH treatment fluids.

37 Claims, 3 Drawing Sheets

(56) References Cited

U.S. PATENT DOCUMENTS

| | | | |
|---|---|---|---|
| 5,922,652 A | 7/1999 | Kowalski et al. | |
| 5,964,291 A | 10/1999 | Bourne et al. | |
| 6,025,302 A | 2/2000 | Pakulski | |
| 6,209,643 B1 | 4/2001 | Nguyen et al. | |
| 6,209,646 B1 | 4/2001 | Reddy et al. | |
| 6,279,656 B1 | 8/2001 | Sinclair et al. | |
| 6,326,335 B1 | 12/2001 | Kowalski et al. | |
| 6,331,508 B1 | 12/2001 | Pakulski | |
| 6,380,136 B1 | 4/2002 | Bates et al. | |
| 6,439,310 B1 | 8/2002 | Scott, III et al. | |
| 6,527,051 B1 | 3/2003 | Reddy et al. | |
| 6,613,899 B1 | 9/2003 | Kuzee et al. | |
| 6,723,683 B2 | 4/2004 | Crossman et al. | |
| 6,866,797 B1 | 3/2005 | Martin et al. | |
| 7,028,776 B2 | 4/2006 | Kirk | |
| 7,270,180 B2 | 9/2007 | Ke et al. | |
| 7,321,979 B2 | 1/2008 | Lee | |
| 7,325,603 B2 | 2/2008 | Kotlar et al. | |
| 7,459,209 B2 * | 12/2008 | Smith et al. | 428/403 |
| 7,491,682 B2 | 2/2009 | Gupta et al. | |
| 7,493,955 B2 | 2/2009 | Gupta et al. | |
| 7,598,209 B2 | 10/2009 | Kaufman et al. | |
| 2002/0128157 A1 | 9/2002 | Bates et al. | |
| 2003/0092342 A1 * | 5/2003 | Tennent et al. | 442/349 |
| 2004/0060702 A1 | 4/2004 | Kotlar et al. | |
| 2004/0074646 A1 | 4/2004 | Kotlar et al. | |
| 2005/0028976 A1 | 2/2005 | Nguyen et al. | |
| 2005/0034868 A1 | 2/2005 | Frost et al. | |
| 2006/0065396 A1 | 3/2006 | Dawson et al. | |
| 2006/0124302 A1 * | 6/2006 | Gupta et al. | 166/279 |
| 2008/0058229 A1 | 3/2008 | Berkland et al. | |
| 2008/0078547 A1 * | 4/2008 | Sinclair et al. | 166/278 |

FOREIGN PATENT DOCUMENTS

| | | |
|---|---|---|
| WO | WO 99/36668 A1 | 7/1999 |
| WO | WO 99/54592 A1 | 10/1999 |
| WO | 0011949 A1 | 3/2000 |
| WO | 0240827 A1 | 5/2002 |
| WO | WO 2005/017313 A1 | 2/2005 |

OTHER PUBLICATIONS

P.J.C. Webb AEA Technology PLC, T.A., et al.; "Economic and Technical Advantages of Revolutionary New Chemical Delivery System for Fractured and Gravel Packed Wells"; SPE 38548; Offshore Europe Conference in Aberdeen, Scotland, Sep. 9-12, 1997; pp. 523-534.

P.J.C. Webb AEA Technology PLC, T.A., et al.; "Economic and Technical Features of a Revolutionary Chemical Scale Inhibitor Delivery Method for Fractured and Gravel Packed Wells: Comparative Analysis of Onshore and Offshore Subsea Applications"; SPE 39451; SPE International Symposium on Formation Damage Control in Lafayette, Louisiana, Feb. 18-19, 1998; pp. 323-336.

Norris, et al.; "Maintaining Fracture Performance Through Active Scale Control"; SPE 68300; Third International Symposium on Oilfield Scale in Aberdeen, UK, Jan. 30-31, 2001; 11 pages.

Norris, et al.; "Hydraulic Fracturing for Reservoir Management: Production Enhancement, Scale Control and Asphaltine Prevention"; SPE 71655; SPE Annual Technical Conference and Exhibition in New Orleans, Louisiana, Sep. 30-Oct. 3, 2001; 12 pages.

McIninch, et al.; "New Relationship Between Oil Company and Service Company Rejuvenates a Mature North Sea Gas Field"; SPE 78327; SPE 13th European Petroleum Conference in Aberdeen, Scotland, UK, Oct. 29-31, 2002; 11 pages.

D.M. Frigo et al.; "Chemical Inhibition of Halite Scaling in Topsides Equipment"; SPE 60191; Second International Symposium on Oilfield Scale in Aberdeen, UK, Jan. 26-27, 2000; 7 pages.

* cited by examiner

METHOD OF USING COMPOSITES IN THE TREATMENT OF WELLS

FIELD OF THE INVENTION

The invention relates to well treatment composites for use in oilfield applications prepared by precipitating a well treatment agent from a liquid onto a water-insoluble adsorbent and in the presence of a metal salt.

BACKGROUND OF THE INVENTION

Fluids produced from wells typically contain a complex mixture of components including aliphatic hydrocarbons, aromatics, hetero-atomic molecules, anionic and cationic salts, acids, sands, silts and clays. The nature of these fluids combined with the severe conditions of heat, pressure, and turbulence to which they are often subjected during retrieval, are contributory factors to scale formation, salt formation, paraffin deposition, emulsification (both water-in-oil and oil-in-water), gas hydrate formation, corrosion, asphaltene precipitation and paraffin formation in oil and/or gas production wells and surface equipment. Such conditions, in turn, decrease permeability of the subterranean formation, reduce well productivity and shorten the lifetime of production equipment. In order to clean deposits from wells and equipment it is necessary to stop the production which is both time-consuming and costly.

Well treatment agents are often used in production wells to prevent the deleterious effects caused by such deposits and precipitates. For instance, scaling in the formation and/or in the production lines downhole and at the surface is often controlled by the use of scale inhibitors.

Several methods are known in the art for introducing well treatment agents into production wells. For instance, a liquid well treatment agent may be forced into the formation by application of hydraulic pressure from the surface which forces the treatment agent into the targeted zone. In most cases, such treatments are performed at downhole injection pressures below that of the formation fracture pressure. Alternatively, the delivery method may consist of placing a solid well treatment agent into the producing formation in conjunction with a hydraulic fracturing operation. This method is often preferred because it puts the treatment agent in contact with the fluids contained in the formation before such fluids enter the wellbore where deleterious effects are commonly encountered.

A principal disadvantage of such methods is the difficulty in releasing the well treatment agent into the well over a sustained period of time. As a result, treatments must repeatedly be undertaken to ensure that the requisite level of treatment agent is continuously present in the well. Such treatments result in lost production revenue due to down time.

Treatment methods have therefore been sought for introducing well treatment agents into oil and/or gas wells wherein the treatment agent may be released over a sustained period of time and wherein continuous attention of operators over prolonged periods is unnecessary.

U.S. Pat. No. 7,491,682 and U.S. Pat. No. 7,493,955 disclose methods of treating a well by use of a composite containing a well treatment agent adsorbed onto a water-insoluble adsorbent, such as diatomaceous earth. Diminished effectiveness of such composites may occur in high pH environments. Alternative composites have been sought for use in high pH environments.

SUMMARY OF THE INVENTION

A composite containing a well treatment agent is disclosed which is especially useful in high pH well treatment fluids. The composite contains a well treatment agent precipitated on a water-insoluble adsorbent in the presence of an alkali metal or an alkaline earth metal. The composite may be prepared in the presence of caustic.

The composite is particularly effective in the treatment of a wellbore or a subterranean formation penetrated by a wellbore. For instance, the composite may be introduced into a subterranean formation or wellbore within a fracturing fluid. The composite is particularly effective in those instances where it is desired to control the rate of release of the well treatment agent over a sustained period of time.

The well treatment agent may be a scale inhibitor, corrosion inhibitor, paraffin inhibitor, salt inhibitor, gas hydrate inhibitor, asphaltene inhibitor, oxygen scavenger, biocide, foaming agent, emulsion breaker or a surfactant.

The water-insoluble adsorbent may be diatomaceous earth, activated carbon, silica particulate, precipitated silica, zeolite, ground walnut shells, fuller's earth or an organic synthetic high molecular weight water-insoluble adsorbents. The surface area of the adsorbent is preferably between from about 1 $m^2/g$ to about 100 $m^2/g$.

Also disclosed is a well treatment composition containing the composite.

In one embodiment, the composite is prepared by precipitating the well treatment agent from a liquid while the well treatment agent is being adsorbed onto the water-insoluble adsorbent in the presence of a metal salt.

The well treatment agent may first be introduced to the adsorbent and then precipitated onto the adsorbent by the addition of the metal salt. For instance, where the composite is to function as a scale inhibitor, the composite may be prepared by first blending a phosphonate with an alkaline earth metal, such as calcium, or an alkali metal and adsorbing the phosphonate onto the water-insoluble adsorbent as it is being precipitated.

After introducing the well treatment agent to the adsorbent and prior to precipitation of the well treatment agent by metal salt onto the adsorbent, the pH may then be neutralized. After being precipitated onto the adsorbent, caustic may further be added to the adsorbent containing the precipitated well treatment agent.

In another embodiment, the composite may be prepared by first introducing the salt of an alkali metal or alkaline earth metal onto the adsorbent and then introducing the well treatment agent to the adsorbent. Caustic may further be introduced to the adsorbent after addition of the well treatment agent.

The invention further relates to a well treatment composite containing a water-insoluble adsorbent and a crystallized precipitate of metal and a well treatment agent as well as a well treatment composite containing a water-insoluble adsorbent and a salt of a well treatment agent. The composite may be prepared by either introducing a metal salt and well treatment agent onto the water-insoluble adsorbent, neutralizing the precipitate and crystallizing the neutralized precipitate onto the adsorbent or precipitating the well treatment agent and metal salt from an aqueous caustic fluid onto the water-insoluble adsorbent and crystallizing the neutralized precipitate onto the adsorbent. The metal salt and well treatment agent may be introduced onto the water-insoluble adsorbent in two separate stages. The well treatment agent and metal salt may be introduced to the water-insoluble adsorbent as an aqueous fluid comprising a liquid acidic well treatment agent and a metal salt. Further, the composite may be prepared by precipitating the well treatment agent and metal salt from an aqueous caustic fluid onto the water-insoluble adsorbent.

The weight or mole ratio of the metal or metal salt and well treatment agent introduced to the water-insoluble adsorbent in producing the composite may be between from about 1:4 to about 4:1.

The weight or mole ratio of the salt and well treatment agent introduced to the water-insoluble adsorbent may be approximately 1:1.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
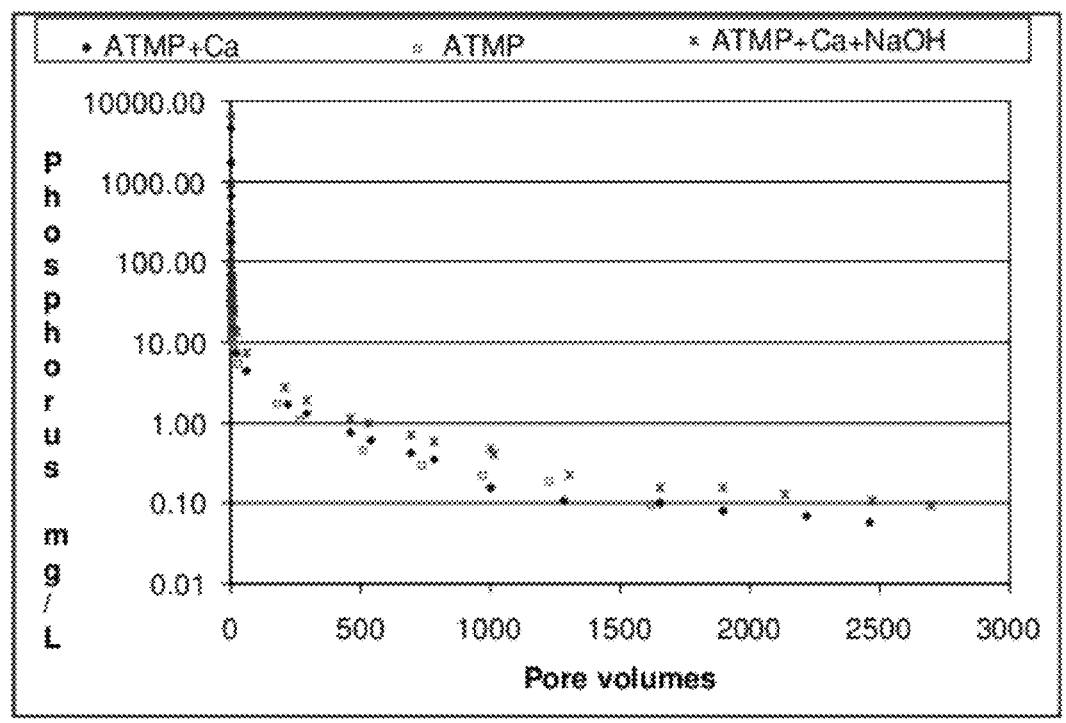
FIG. 1 represents the inhibitor return curve for products prepared in accordance with the invention, as discussed in Example 1.

The composites defined herein contain a well treatment agent adsorbed onto a water-insoluble adsorbent. When used in an oil, gas or geothermal well or a subterranean formation penetrated by such a well, the well treatment agent is slowly released from the adsorbent.

The composite is prepared by adsorbing the well treatment agent from a liquid onto the water-insoluble adsorbent in the presence of a metallic salt. The product containing the adsorbed well treatment agent may then be dried.

In one embodiment, the composite is prepared by first introducing the well treatment agent to the adsorbent to form a treated adsorbent. The well treatment agent is then precipitated or salted onto the adsorbent by introducing a metal salt to the treated adsorbent. Prior to introducing the metal salt to the treated adsorbent, the treated adsorbent may be neutralized by the addition of caustic. Alternatively, caustic may be introduced to the treated adsorbent after the addition of the metal salt.

The amount of caustic added to the treated water-insoluble adsorbent is between from about 2 to about 6 equivalents per 1 equivalent of well treatment composite and preferably between about 4 equivalents per 1 equivalent of well treatment composite.

The well treatment composite may further be prepared by first adsorbing a metal salt onto the adsorbent and then introducing the well treatment agent to the adsorbent containing the metal salt. Caustic may be introduced to the adsorbent after the addition of the well treatment agent.

Further, the well treatment composite may be prepared by a method to produce an adsorbent and a crystallized precipitate of well treatment agent and either a metal or a metal salt on the adsorbent. In this method, the composite may be prepared by introducing the metal salt and well treatment agent onto the water-insoluble adsorbent. The metal salt and well treatment agent may be introduced onto the water-insoluble adsorbent in one stage or in two separate stages. The resulting product may then be dried and neutralized. The neutralized well treatment agent is then precipitated onto the adsorbent. The product is then permitted to dry.

In another method, the well treatment and metal salt are precipitated from an aqueous caustic fluid onto the water-insoluble adsorbent. The neutralized precipitate is then crystallized onto the adsorbent. This method is particularly effective where the aqueous caustic fluid contains an acidic well treatment agent.

Typically, the molar ratio of metal salt to well treatment agent used to precipitate the well treatment agent onto the adsorbent is between from about 10:1 about 1:10, more typically between from about 4:1 to about 1:1.

The amount of well treatment agent in the well treatment composite is normally between from about 20 to 55 weight percent.

The metal as well as the metal of the metal salt is preferably an alkali metal, alkaline earth metal, and transition metal, such as sodium, potassium, calcium, magnesium, cobalt, nickel, copper, zinc and iron. Ammonium is further included under the definition of metal salt herein. In a preferred embodiment, the salt is an alkali metal or an alkaline earth metal and includes halides, hydroxides and sulfates of such metals, such as calcium chloride, magnesium chloride, sodium sulfate, potassium hydroxide, sodium hydroxide and potassium sulfate. In a most preferred embodiment, the metal is calcium and the metal salt is calcium chloride. Normally, the metals or metal salts are in aqueous solution when applied to the adsorbent.

In a preferred embodiment, the well treatment agent may be at least one member selected from the group consisting of demulsifying agents (both water-in-oil and oil-in-water), corrosion inhibitors, scale inhibitors, paraffin inhibitors, gas hydrate inhibitors, salt formation inhibitors and asphaltene dispersants.

Further, other suitable treatment agents include foaming agents, oxygen scavengers, biocides and surfactants as well as other agents wherein slow release into the production well is desired.

Adsorption of the well treatment agent onto the adsorbent reduces (or eliminates) the amount of well treatment agent required to be in solution. Since the well treatment agent is adsorbent onto a substrate, only a small amount of well treatment agent may be released into the aqueous medium.

The well treatment agent is preferably a liquid material. If the well treatment agent is a solid, it can be dissolved in a suitable solvent, thus making it a liquid.

In a preferred embodiment, the well treating composite of the invention effectively inhibits controls, prevents or treats the formation of inorganic scale formations being deposited in subterranean formations, such as wellbores, oil wells, gas wells, water wells and geothermal wells. The composites of the invention are particularly efficacious in the treatment of scales of calcium, barium, magnesium salts and the like, including barium sulfate, calcium sulfate, and calcium carbonate scales. The composites may further have applicability in the treatment of other inorganic scales, such as zinc sulfide, iron sulfide, etc.

Suitable scale inhibitors are anionic scale inhibitors.

Preferred scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Further useful, especially for brines, are chelating agents, including diethylenetriaminepentamethylene phosphonic acid and ethylenediaminetetra acetic acid.

The well treatment agent may further be any of the fructans or fructan derivatives, such as inulin and inulin derivatives, as disclosed in U.S. Patent Publication No. 2009/0325825, herein incorporated by reference.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Paraffin inhibitors useful for the practice of the present invention include, but are not limited to, ethylene/vinyl acetate copolymers, acrylates (such as polyacrylate esters and methacrylate esters of fatty alcohols), and olefin/maleic esters.

Exemplary corrosion inhibitors useful for the practice of the invention include but are not limited to fatty imidazolines, alkyl pyridines, alkyl pyridine quaternaries, fatty amine quaternaries and phosphate salts of fatty imidazolines.

Gas hydrate treating chemicals or inhibitors that are useful for the practice of the present invention include but are not limited to polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary asphaltene treating chemicals include but are not limited to fatty ester homopolymers and copolymers (such as fatty esters of acrylic and methacrylic acid polymers and copolymers) and sorbitan monooleate.

Suitable foaming agents include, but are not limited to, oxyalkylated sulfates or ethoxylated alcohol sulfates, or mixtures thereof.

Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers include triazines, maleimides, formaldehydes, amines, carboxamides, alkylcarboxylazo compounds cumine-peroxide compounds morpholino and amino derivatives morpholine and piperazine derivatives, amine oxides, alkanolamines, aliphatic and aromatic polyamines.

The composite of the invention does not require excessive amounts of well treatment agents. The amount of well treatment agent in the composite is that amount sufficient to effectuate the desired result over a sustained period of time and may be as low as 1 ppm. Generally, the amount of well treatment agent in the composite is from about 0.05 to about 5 (preferably from about 0.1 to about 2) weight percent based upon the total weight of the composite.

For instance, where the well treatment agent is a scale inhibitor, the amount of scale inhibitor present in the composite is that amount required to prevent, or to at least substantially reduce the degree of, scale formation. For most applications, the amount of scale inhibitor in the well treating composite may be as low as 1 ppm. Such small amounts of scale inhibitor may be sufficient for up to 1,000 pore volumes and typically provides up to six months of continuous inhibition. Costs of operation are therefore significantly lowered.

The water insoluble adsorbent may be any of various kinds of commercially available high surface area materials having the affinity to adsorb the desired well treatment agent. Typically, the surface area of the adsorbent of the well treating composite is between from about 1 $m^2/g$ to about 100 $m^2/g$.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or meta-silicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The weight ratio of well treatment agent to water-insoluble adsorbent is generally between from about 90:10 to about 10:90.

The adsorption of the liquid (or solution of) well treatment agent onto the solid adsorbent limits the availability of the free well treatment agent in water. In addition, the composite itself has limited solubility in water. When placed into a production well, the well treatment agent slowly dissolves at a generally constant rate over an extended period of time in the water which is contained in the formation. The controlled slow release of the agent is dependent upon the surface charges between the well treatment agent and adsorbent which, in turn, is dependent upon the adsorption/desorption properties of the agent to adsorbent.

Generally, the lifetime of a single treatment using the composite of the invention is between six and twelve months and may be in excess of 3 years depending upon the volume of water produced in the production well and the amount of well treatment agent bound to the water-insoluble adsorbent.

Well treating compositions in accordance with the invention include the composite. The carrier fluid may be a brine, salt water, fresh water, a liquid hydrocarbon, or a gas such as nitrogen or carbon dioxide. Suitable compositions include fracturing fluids, completion fluids, acidizing compositions, etc. When used in fracturing, the fluid may or may not contain a proppant.

The composites are particularly effective when used in environments characterized by high pH such as at a pH in excess of 7.0. Such composites are further effective in fluids having a pH in excess of 11.0.

The amount of composite present in the well treating composition is typically between from about 15 ppm to about 100,000 ppm depending upon the severity of the scale deposition. When the carrier fluid is brine, the weight percentage of the composite in the composition is generally between from about 0.02 to about 2 weight percent.

The composition may further contain between from 0 to about 10 weight percent of an inorganic salt. Suitable inorganic salts include KCl, NaCl, and $NH_4Cl$.

The well treating composition may be used to control and/or prevent the undesired formation of scales, salts, paraffins, gas hydrates, asphaltenes as well as corrosion in formations or on surface equipment. Further, other suitable treatment agents include foaming agents, oxygen scavengers, biocides, emulsifiers (both water-in-oil and oil-in-water) and surfactants as well as other agents may be employed with the adsorbent when it is desired to slowly slow release such agents into the production well.

The well treating composition of the invention may be used in stimulation treatments as a component of a fracturing fluid or acidizing fluid, such as a matrix acidizing fluid. The composite has particular applicability in completion fluids containing zinc bromide, calcium bromide calcium chloride and sodium bromide brines. Such fluids may be introduced down the annulus of the well and, when desired, flushed with produced water.

In a particularly preferred embodiment, the composites of the invention are used in fluids used for the treatment of gas wells or oils wells wherein it is desired to prevent or inhibit the formation of scales, control the formation of scales or retard the release of scale inhibitors into the well. For instance, the composite may be used in completion or production services. The composites of the invention may be used in the well to remove scales from or control the formation of scales onto tubular surface equipment within the wellbore.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

Scale inhibitors were prepared consisting of calcium phosphonate adsorbed onto diatomaceous earth by introducing 740 g calcium chloride in a liquid (30% calcium chloride) form to 930 g of 10/50 mesh diatomaceous earth (Celite® MP-79). (Celite is a registered trademark of the Celite Corporation.) To this mixture was then added 598 g of 50% active aminotri(methylene phosphonic acid) (ATMP). This mixture was then dried for two hours at 220° F. to render Product A1. 160 g of 50% sodium hydroxide was then added and again dried to form Product A2. Product A1 and Product A2 were prepared in accordance with the equations below (wherein "DE" refers to diatomaceous earth):

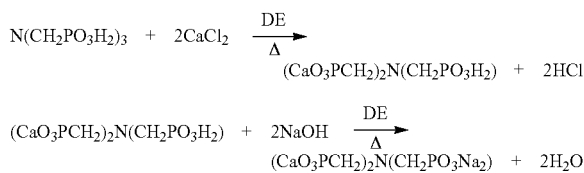

Each of A1 and A2 contained 20 percent by weight ATMP. The percent active salt in A1 and A2 was 25.1 and 30.8, respectively.

Example 2

The elution characteristics of the products of A1 and A2 of Example 1 were compared to the scale inhibitor composite prepared in the Examples of U.S. Pat. No. 7,491,682. Each of the samples contains, as scale inhibitor, ATMP. Approximately 55 grams 20/40 Ottawa white frac sand and 1.1 grams of each of the dried products of Example 1 were packed into a 35 cm length stainless steel column having an inner diameter of 1.08 cm. The column was eluted with a synthetic brine of 0.025 mol/L calcium chloride, 0.015 mol/L of sodium bicarbonate and 1 mol/L sodium chloride while being sparged with 100% carbon dioxide at 60° C. wherein the flow rate was 120 ml/hour which corresponded to 275 feet/day linear flow velocity. The effluent solution was collected and analyzed for phosphonate and Ca concentration to obtain the inhibitor flowback curve of FIG. 1 wherein the pore volume of the column was approximately 12 milliliters. FIG. 1 illustrates Product A2, when compared to the prior art composite, exhibited the best inhibitor return performance followed by Product A1.

Example 3

Figure 2:
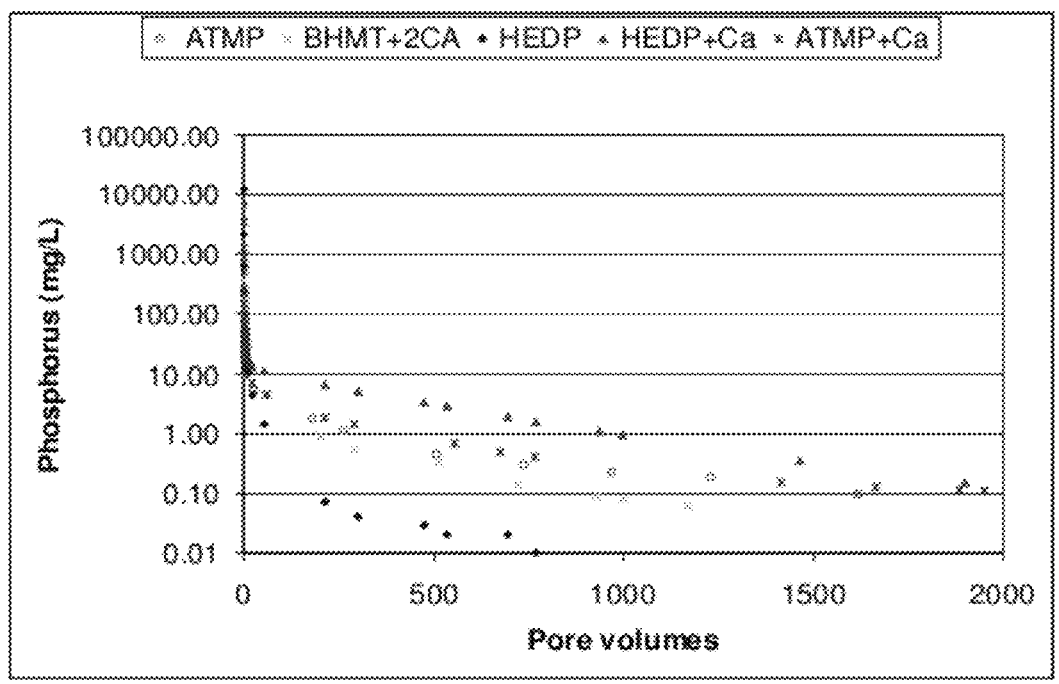
FIG. 2 represents the inhibitor return curve for products prepared in accordance with the invention, as discussed in Example 3.

Barium scale inhibitors, other than that set forth in U.S. Pat. No. 7,491,682, were explored. Products similar to Product A1 were prepared except, in place of ATMP, bis-(hexamethylene)triaminepenta(methylene)phosphonic acid (BHMT) as well as 1-hydroxyethylidene-1,1-diphosphonic acid (HEDP) were used. These products were compared with the scale inhibitor made in accordance with the Example of U.S. Pat. No. 7,491,682 as well as a scale inhibitor made in accordance with the Example of U.S. Pat. No. 7,491,682 except substituting HEDP for the phosphonic acid. Inhibitor flowback curves, as detailed in Example 2, were obtained, as illustrated in FIG. 2. HEDP was shown to be unacceptable because it desorbed too quickly in contrast to HEDP calcium salt.

Example 4

This Example illustrates the effect of the order of addition of calcium and caustic on the composite on the desorption rates. The composites were prepared by first adding 50 g of a 60% active solution of 1-hydroxyl ethylidene-1,1-diphosphonic acid (HEDP) onto 70 g of 10/50 mesh diatomaceous earth (Celite MP-79) with manual mixing followed by drying for two hours at 220° F. This is referred to as the base HEDP/DE mixture below. The calcium and caustic were added in various sequences as follow:

HEDP+(Ca+2NaOH): 1 equivalent calcium chloride was dissolved in 2 equivalents sodium hydroxide which was then added to the base mixture of HEDP/DE with manual mixing. This resulting mixture was then dried;

HEDP+NaOH+Ca: 1 equivalent sodium hydroxide was added to the HEDP/DE mixture in a fluidized bed, then dried. 1 equivalent calcium chloride was then added to this mixture in a fluidized bed and dried. This is referred to as HEDP+NaOH+Ca in FIG. 3. This process gave the most uniform particle size;

HEDP+2NaOH+Ca: 2 equivalents sodium hydroxide were added to the HEDP/DE mixture with manual mixing and dried. Then 1 equivalent of calcium chloride was added with manual mixing and this subsequent mixture was also dried;

HDEP+Ca+NaOH: 1 equivalent calcium chloride was added to and manually mixed with the HEDP/DE mixture and dried. Then 1 equivalent sodium hydroxide was added with manual mixing and this subsequent mixture was also dried. This is referred to as HEDP+Ca+NaOH in FIG. 3;

HEDP+Ca+2NaOH: 1 equivalent calcium chloride was added to the HEDP/DE mixture with manual mixing. After drying, 2 equivalents sodium hydroxide were added, manually mixed and again dried.

Figure 3:
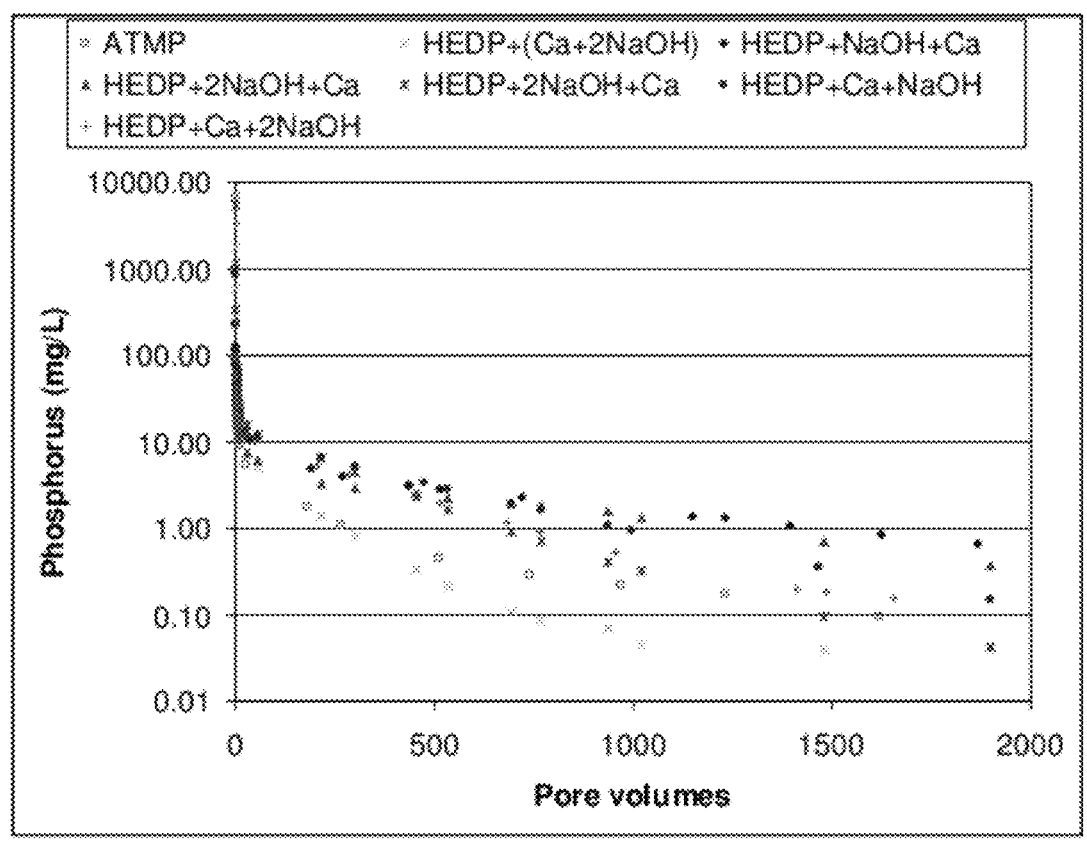
FIG. 3 demonstrates the effect that the order of addition of metal and caustic has on the desorption rates of composites made in accordance with the invention, as discussed in Example 4.

FIG. 3 illustrates the inhibitor flowback curves (in accordance with the procedure of Example 2) wherein "ATMP" refers to the composite prepared in the Example of U.S. Pat. No. 7,491,682.

From the foregoing, it will be observed that numerous variations and modifications may be effected without departing from the true spirit and scope of the novel concepts of the invention.

What is claimed is:

1. A method of treating a subterranean formation or a wellbore which comprises introducing into the formation or wellbore a well treatment composite comprising a well treatment agent adsorbed onto a water-insoluble adsorbent, wherein the composite is prepared by precipitating the well treatment agent from a liquid while the well treatment agent is being adsorbed onto the water-insoluble adsorbent and further wherein the well treatment agent is precipitated in the presence of a metal salt.

2. The method of claim 1, wherein the well treatment agent is at least one member selected from the group consisting of scale inhibitors, corrosion inhibitors, paraffin inhibitors, salt inhibitors, gas hydrate inhibitors, asphaltene inhibitors, oxygen scavengers, biocides, foaming agent, emulsion breakers and surfactants.

3. The method of claim 2, wherein the well treatment agent is a scale inhibitor.

4. The method of claim 1, wherein the metal salt is selected from the group consisting of an alkali or alkaline earth metal halide.

5. The method of claim 1, further wherein the composite is prepared in the presence of caustic.

6. The method of claim 1, wherein the composite is prepared by (a) first introducing the well treatment agent to the adsorbent and then (b) precipitating the well treatment agent onto the adsorbent by the addition of the metal salt.

7. The method of claim 6, the product of step (a) is neutralized prior to step (b).

8. The method of claim 6, wherein caustic is further introduced to the adsorbent after step (b).

9. The method of claim 1, wherein the composite is prepared by (a) first introducing the metal salt onto the adsorbent and then (b) introducing the well treatment agent to the adsorbent.

10. The method of claim 1, wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

11. The method of claim 1, comprising a water-insoluble adsorbent and a crystallized precipitate of either (A) metal and a well treatment agent; or (B) a salt of a well treatment agent, prepared by either:
 a) introducing a metal salt and well treatment agent onto the water-insoluble adsorbent and neutralizing the product and then precipitating the neutralized well treatment agent onto the adsorbent; or
 b) precipitating the well treatment agent and a metal salt from an aqueous caustic fluid onto the water-insoluble adsorbent and then crystallizing the neutralized precipitate onto the adsorbent.

12. The method of claim 11, wherein the metal salt and well treatment agent are introduced onto the water-insoluble adsorbent in two separate stages.

13. The method of claim 11, wherein the well treatment agent and metal salt are introduced to the water-insoluble adsorbent as an aqueous fluid comprising a liquid acidic well treatment agent and a metal salt.

14. The method of claim 11, wherein the composite is prepared by precipitating the well treatment agent and metal salt from an aqueous caustic fluid onto the water-insoluble adsorbent.

15. The method of claim 11, wherein the well treatment agent is at least one member selected from the group consisting of scale inhibitors, corrosion inhibitors, paraffin inhibitors, salt inhibitors, gas hydrate inhibitors, asphaltene inhibitors, oxygen scavengers, biocides, foaming agent, emulsion breakers and surfactants.

16. The method of claim 15, wherein the well treatment agent is a scale inhibitor.

17. The method of claim 11, wherein the weight or mole ratio of the metal salt and well treatment agent introduced to the water-insoluble adsorbent is between from about 1:4 to about 4:1.

18. The method of claim 1, wherein the weight or mole ratio of the metal salt and well treatment agent introduced to the water-insoluble adsorbent is approximately 1:1.

19. The method of claim 8, wherein the amount of caustic added to the water-insoluble adsorbent is between from about 2 to 6 equivalents per 1 equivalent of well treatment composite.

20. The method of claim 19, wherein the amount of caustic added to the water-insoluble adsorbent is about 4 equivalents per 1 equivalent of well treatment composite.

21. The method of claim 3, wherein the scale inhibitor is anionic.

22. The method of claim 11, wherein the metal of (a) or the metal of the salt of (b) is selected from the group consisting of alkali metals, alkaline earth metals, transition metals or ammonium.

23. The method of claim 22, wherein the salt is an alkali metal or an alkaline earth metal.

24. The method of claim 23, wherein the salt is an alkaline earth metal.

25. The method of claim 24, wherein the alkaline earth metal is calcium.

26. The method of claim 1, wherein the surface area of the adsorbent is between from about 1 m$^2$/g to about 100 m$^2$/g.

27. The method of claim 1, wherein the amount of well treatment agent in the composite is between from about 20 to 55 weight percent.

28. The method of claim 1, wherein the weight ratio of well treatment agent to water-insoluble adsorbent in the well treatment composite is between from about 90:10 to about 10:90.

29. The method of claim 10, wherein the water-insoluble adsorbent is diatomaceous earth or ground walnut shells.

30. The method of claim 1 wherein the well treatment composite is in a carrier fluid.

31. The method of claim 30, wherein the carrier fluid further includes a proppant.

32. The method of claim 30, wherein the amount of well treatment composite in the fluid is between from about 0.1 to about 2 weight percent of the proppant.

33. The method of claim 30, wherein the pH of the well treating fluid is greater than 7.0.

34. The method of claim 31, wherein the well treating fluid is a fracturing fluid or acidizing fluid.

35. The method of claim 31, wherein the pH of the well treating fluid is greater than 7.0.

36. The method of claim 35, wherein the pH of the well treating fluid is greater than 11.0.

37. A method of controlling the rate of release of a well treatment agent in a wellbore comprising introducing into the wellbore a well treatment composite comprising a well treatment agent adsorbed onto a water-insoluble adsorbent, wherein the composite is prepared by precipitating the well treatment agent from a liquid while the well treatment agent is being adsorbed onto the water-insoluble adsorbent and further wherein the well treatment agent is precipitated in the presence of a metal salt.

* * * * *